(12) United States Patent
Kitazawa

(10) Patent No.: US 6,633,347 B2
(45) Date of Patent: Oct. 14, 2003

(54) DISPLAY ASSEMBLY HAVING DISPLAY SUPPORTED ON CASING TO BE CONTROLLABLE IN ATTITUDE

(75) Inventor: Akitoshi Kitazawa, San Pedro, CA (US)

(73) Assignee: Alpine Electronics, Inc., Tokyo (JP)

( * ) Notice: Subject to any disclaimer, the term of this patent is extended or adjusted under 35 U.S.C. 154(b) by 59 days.

(21) Appl. No.: 09/753,215

(22) Filed: Jan. 2, 2001

(65) Prior Publication Data

US 2002/0085129 A1 Jul. 4, 2002

(51) Int. Cl.$^7$ .................................................. H04N 5/64
(52) U.S. Cl. ...................................... 348/837; 248/919
(58) Field of Search ................................ 348/836, 837; 312/7.2, 223.1, 245; 248/918, 919, 920, 921, 922, 923, 278.1; 224/311; 296/37.7, 37.8; D14/132

(56) References Cited

U.S. PATENT DOCUMENTS

| | | | | |
|---|---|---|---|---|
| 5,096,271 A | * | 3/1992 | Portman | 312/7.2 |
| 5,179,447 A | * | 1/1993 | Lain | 348/837 |
| 5,467,106 A | * | 11/1995 | Salomon | 345/87 |
| 5,946,055 A | | 8/1999 | Rosen | 348/837 |
| 6,115,086 A | * | 9/2000 | Rosen | 348/837 |
| 6,125,030 A | * | 9/2000 | Mola et al. | 248/919 X |
| 6,157,418 A | * | 12/2000 | Rosen | 348/837 |
| 6,186,459 B1 | * | 2/2001 | Ma | 248/919 X |
| 6,246,449 B1 | * | 6/2001 | Rosen | 348/837 |
| 6,256,837 B1 | * | 7/2001 | Lan et al. | 248/921 X |
| 6,292,236 B1 | * | 9/2001 | Rosen | 348/837 |
| 6,338,517 B1 | * | 1/2002 | Canni et al. | 296/37.8 |
| 6,339,455 B1 | * | 1/2002 | Allan et al. | 348/837 |
| 6,361,012 B1 | * | 3/2002 | Chang | 248/278.1 X |
| D457,506 S | * | 5/2002 | Scribner | D14/132 |
| 6,409,242 B1 | * | 6/2002 | Chang | 296/37.7 |

FOREIGN PATENT DOCUMENTS

| | | | | |
|---|---|---|---|---|
| JP | 4-185547 | * | 7/1992 | 348/837 |
| JP | 5-000640 | * | 1/1993 | 348/837 |

* cited by examiner

*Primary Examiner*—James O. Hansen
(74) *Attorney, Agent, or Firm*—Brinks Hofer Gilson & Lione (57) ABSTRACT

A display assembly to be mounted on a ceiling portion of a space includes a casing having a downwardly directed face and a receptacle cavity of a substantially rectangular shape and opening into the face; and a display unit having a display screen to be received within the receptacle cavity. The display unit is connected to the casing so as to be controllable in attitude. The display assembly is provided with a rotary body rotatable about a first axis substantially perpendicular to the face of the casing. The display unit is supported on the rotary body for pivoting about a second axis extending perpendicular to the first axis. When the rotary body is placed at a predetermined rotational position, the display unit is pivoted relative to the rotary body to be received within the receptacle cavity.

18 Claims, 5 Drawing Sheets

DISPLAY ASSEMBLY HAVING DISPLAY SUPPORTED ON CASING TO BE CONTROLLABLE IN ATTITUDE

BACKGROUND OF THE INVENTION

1. Field of the Invention

The present invention relates to a display assembly to be mounted downwardly on a ceiling, for example, in a passenger compartment of an automotive vehicle. More particularly, the invention relates to a display assembly having a display unit movable between a retracted position, in which the display unit is received within a receptacle cavity of a casing, and a deployed position (or a viewable position), in which the display unit is turned downwardly to make its display screen viewable by a person.

2. Description of the Related Art

As one type of automotive display assembly to be provided within the passenger compartment of an automotive vehicle, there is an overhead type display assembly, in which a display unit is pivotably supported for pivoting between a retracted position where the display unit is oriented substantially parallel to the ceiling of the passenger compartment and a deployed position (or viewable position) where the display unit is oriented downwardly. The display unit is provided with a display screen which is formed with a liquid crystal display panel or the like. With the display unit being pivoted in the deployed position, the display screen can be viewed by one or more passengers in a rear seat of the vehicle.

An automotive display assembly of this type has been disclosed in U.S. Pat. No. 5,946,055 to Rosen. This automotive display assembly includes a housing (or casing) defining a cavity, which is opened in a generally rectangular shape for accommodating a display unit. A support member is pivotally supported on one edge of the cavity. The support member is pivotable about a first shaft which extends horizontally. The display unit is pivotably supported on the support member by a second shaft extending perpendicular to the first shaft.

In the automotive display assembly constructed as set forth above, the display unit, which is normally placed at the retracted position, is deployed or descended to the deployed position by driving the support member to pivot about the first shaft. At this deployed position, the display unit may be pivotable about the second shaft for varying the orientation of the display screen.

In the automotive display assembly disclosed in the above-identified U.S. Pat. No. 5,946,055, if the support member is pivoted about the first shaft to have the second shaft in a substantially up-right position with respect to the lower surface of the housing, interference between the lower surface of the housing and the display unit will never be caused when the display unit is pivoted about the second shaft. However, when the support member is pivoted to orient the second shaft at an angular position of less than 90° or more than 90°, and the display unit is pivoted about the second shaft at this position, interference may be caused between the display unit and the lower surface of the housing if the pivoted angle about the second shaft is large.

Accordingly, in the automotive display assembly in the prior art, the display unit must be oriented only in the substantially up-right position with respect to the lower surface of the housing to be able to turn the display unit at a large pivoted angle. As a result, it is difficult to adjust the orientation of the display screen at an arbitrary angular position.

In addition, since the display unit having a relatively large weight is pivotably supported on the support member by a thin shaft, the support structure for supporting the display unit on the support member is relatively weak and causes play in the connecting portion between the display unit and the support member after a long time of use.

SUMMARY OF THE INVENTION

An object of the present invention is to provide a display assembly that permits a display unit to be turned toward the left or right without causing interference with a casing when the display unit is obliquely deployed relative to the surface of the casing.

Another object of the present invention is to provide a display assembly with a strengthened connecting means for connecting a display unit to a casing to be controllable in attitude.

According to one aspect of the present invention, there is provided a display assembly to be mounted on a ceiling portion of a space comprising:

a casing having a downwardly directed face and a receptacle cavity of a substantially rectangular shape and opening into the face;

a display unit having a display screen to be received within the receptacle cavity; and connecting means for connecting the display unit to the casing so as to be controllable in attitude, the connecting means having a rotary body rotatable about a first axis substantially perpendicular to the face of the casing, the display unit being supported on the rotary body for pivoting about a second axis extending perpendicular to the first axis, whereby when the rotary body is placed at a predetermined rotational position, the display unit is pivoted relative to the rotary body to be received within the receptacle cavity.

It is preferred that when the rotary body is placed at the predetermined rotational position, the rotary body has a wall surface to be substantially flush with one of inner side walls of the receptacle cavity and the second axis becomes parallel to the one inner side wall of the receptacle cavity, to thereby enable the display unit to be received in the receptacle cavity.

It is also preferred that the casing is formed with a circular cavity formed to extend from the face of the casing to an inner bottom surface of the receptacle cavity, that the rotary body is of a generally disc shape and has a first half-disc portion having a lower surface lying substantially flush with the face of the casing and a second half-disc portion having a lower surface lying substantially flush with the inner bottom surface of the receptacle cavity, that the rotary body is rotatably supported within the circular cavity, and that the first and second half-disc portions are arranged at opposite sides across a boundary wall lying therebetween and providing the wall surface of the rotary body.

BRIEF DESCRIPTION OF THE DRAWINGS

The present invention will be understood more fully from the detailed description given hereinafter and from the accompanying drawings, which, however, should not be taken to limit the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific detailed. On the other hand, well known structures are not shown in detail in order to avoid unnecessary obscurity of the present invention.

Figure 1:
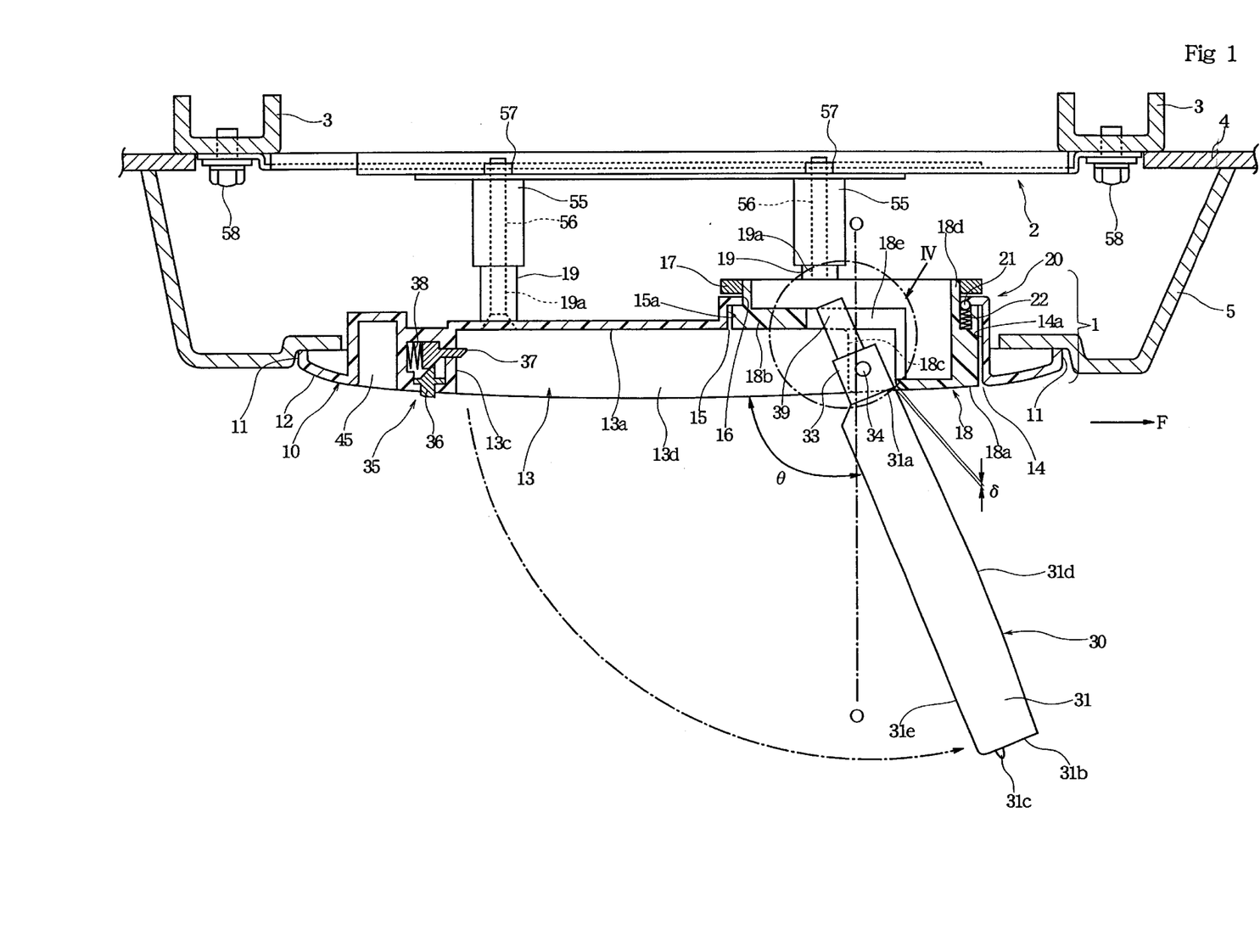
FIG. 1 is a section showing an automotive display assembly according to one embodiment of the present invention as mounted on a ceiling in a passenger compartment of an automotive vehicle.

In FIG. 1, the reference numeral 1 generally denotes an automotive display assembly according to one embodiment of the present invention. The reference numeral 2 denotes a mounting means for the display assembly 1. The mounting means 2 is secured to a pair of cross ribs 3 of a vehicular roof panel. When the automotive display assembly 1 is to be secured by the mounting means 2, a cover 5 is disposed between a lining 4 covering the roof panel and thereby forming the ceiling of the automotive vehicle, and the automotive display assembly 1. Thus, all around the automotive display assembly 1, a gap between the automotive display assembly 1 and the lining 4 is covered by the cover 5.

A construction of the automotive display assembly 1 will be discussed first. The automotive display assembly 1 has a casing (or housing) 10. The casing 10 is formed of a plastic material. The casing 10 has a relatively thin outer peripheral wall 11 and a face plate 12 for facing downwardly when the display assembly is secured on the ceiling of the automotive vehicle. The face plate 12 has a curved, convex surface gradually protruding downwardly closer to the center portion of the casing 10.

The casing 10 defines a generally rectangular receptacle cavity 13 which opens into the face plate 12 and is recessed upwardly from the face plate 12. The receptacle cavity 13 has an inner bottom wall 13a, an inner side wall (or inner front wall) 13b on the side for supporting a display unit, an inner side wall (or inner rear wall) 13c on the side for locking the display unit and opposing the inner front wall 13b, and inner side walls 13d and 13e extending perpendicular to the inner front and rear walls 13b and 13c and opposing one another.

Figure 3:
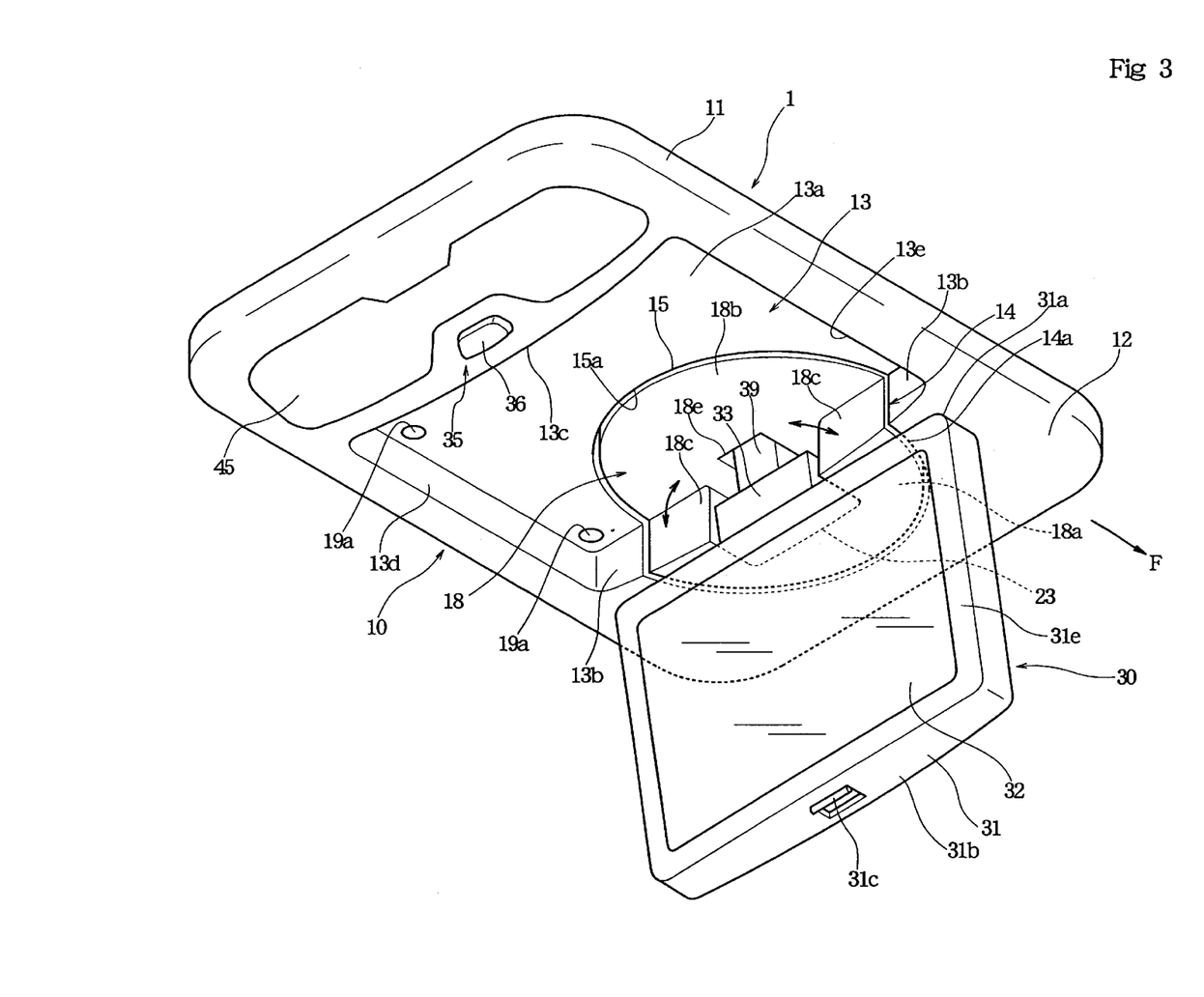
FIG. 3 is a perspective view of the automotive display assembly of FIG. 1 as viewed from below, in which the display unit is in a deployed position (or viewable position)

As shown in FIG. 3, the inner front wall 13b is discontinuous at a center portion thereof to have left and right wall portions. Between these left and right wall portions of the inner front wall 13b, a first semi-circular cavity 14 is formed to penetrate into the front portion of the face plate 12. As shown in FIG. 1, the first semi-circular cavity 14 has a semi-circular inner wall 14a. In the inner bottom wall 13a of the receptacle cavity 13, a second semi-circular cavity 15 is formed which is continuous with the first semi-circular cavity 14. The second semi-circular cavity 15 has a semi-circular inner wall 15a. The semi-circular inner wall 14a of the first semi-circular cavity 14 and the semi-circular inner wall 15a of the second semi-circular cavity 15 are continuous to form a substantially cylindrical wall surface. By this cylindrical wall surface, there is formed a circular cavity for accommodating a rotary body.

The circular cavity formed by the first semi-circular cavity 14 and the second semi-circular cavity 15 accommodates a disc-shaped rotary body 18 in a rotatable condition. The rotary body 18 has a first half-disc portion 18a having a lower surface lying substantially flush with the surface of the face plate 12 and a second half-disc portion 18b integral with the first half-disc portion 18a and having a lower surface lying substantially flush with the surface of the inner bottom wall 13a. The boundary between the first half-disc portion 18a and the second half-disc portion 18b is stepped with a wall 18c. When the rotary body 18 is placed at a position shown in FIGS. 1 to 3, the wall surface of the wall 18c is substantially flush with the inner front wall 13b of the receptacle cavity 13.

As shown in FIG. 1, in the casing 10 there is formed a support hole 16 having a large diameter and opening upwardly within the circular cavity formed by the first semi-circular cavity 14 and the second semi-circular cavity 15. More specifically, at the upper end of the circular inner wall (formed with the semi-circular inner wall 14a and the semi-circular inner wall 15a), there is integrally formed a ring-shaped flange portion, which extends inwardly and defines the support hole 16. An upper end portion 18d of the rotary body 18 is rotatably inserted within the support hole 16. The upper end portion 18d further projects upwardly from the support hole 16. A retainer ring 17 is fixed on the outer peripheral surface of the upper end portion 18d. Therefore, the rotary body 18 is rotatable about an axis O—O which is substantially perpendicular to the surface of the face plate 12 of the casing 10.

As shown in FIG. 1, between the rotary body 18 and the casing 10, a locking means 20 is provided. The locking means 20 has a ball 21 and a spring 22 biasing the ball 21 toward the casing 10 from the rotary body 18. In the aforementioned ring-shaped flange portion defining the support hole 16, a recess is formed on the side of first semi-circular cavity 14. The ball 21 penetrates into the recess to establish a lightly locked condition of the rotary body 18.

Figure 2:
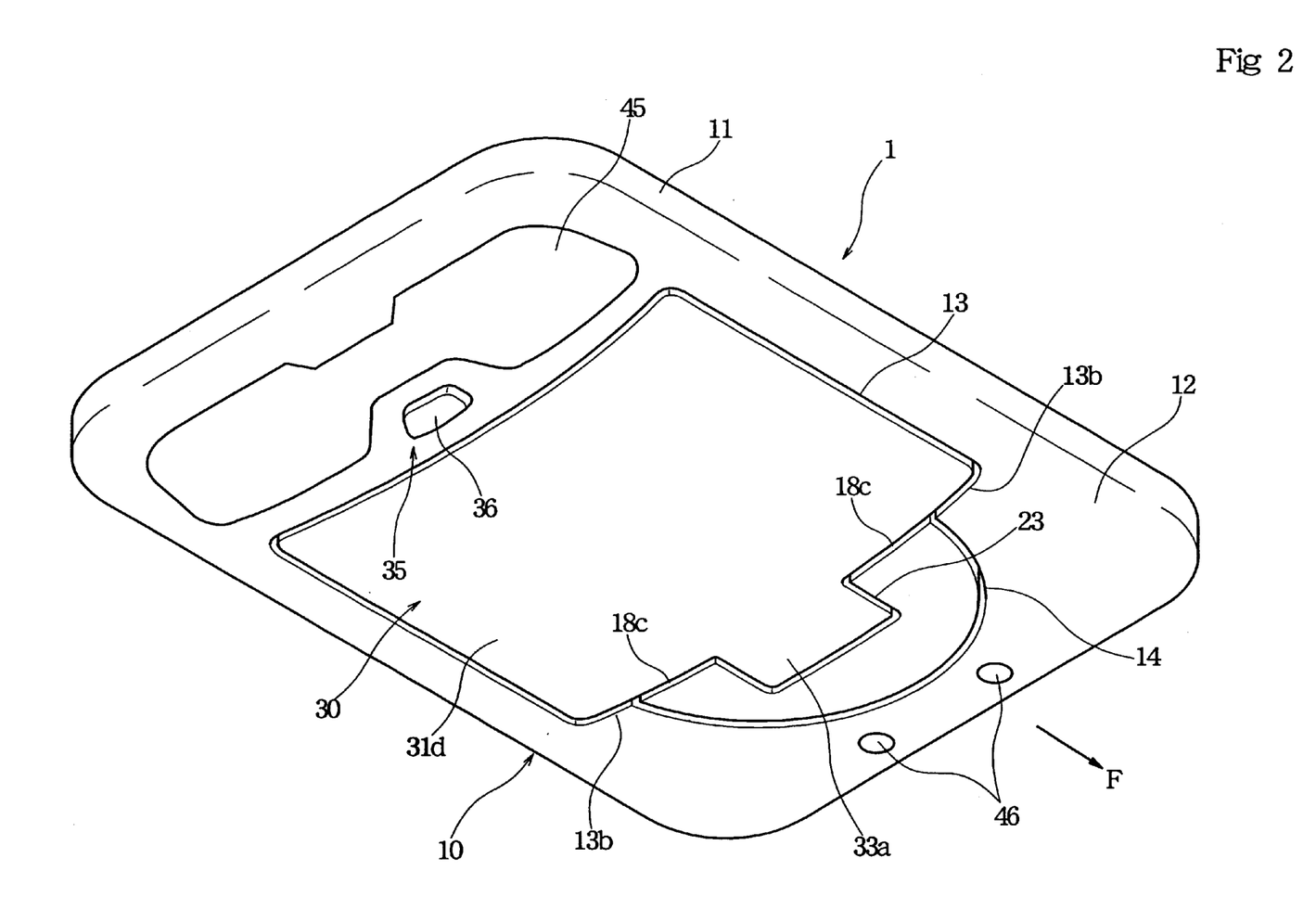
FIG. 2 is a perspective view of the automotive display assembly of FIG. 1 as viewed from below, in which a display unit is in a retracted position.

When the ball 21 of the locking means 20 penetrates into the recess to establish a lightly locked condition of the rotary body 18, the surface of the wall 18c of the rotary body 18 lies substantially flush with the wall surface of the inner front wall 13b of the receptacle cavity 13, as shown in FIGS. 1 to 3. In addition, the ring-shaped flange portion may be formed with a plurality of recesses so that rotary body 18 may be lightly locked by the locking means 20 when horizontally rotated at any one of a number of predetermined rotation angles to the left or right about the axis O—O from the condition shown in FIGS. 1 to 3.

As shown in FIGS. 2 and 3, the central portion of the wall 18c is recessed to define a support recess 23 extending toward the first half-disc portion 18a (in the direction indicated at F). The support recess 23 opens in a generally rectangular shape into the lower surface of the first half-disc portion 18a.

A display unit 30 has a frame body 31. The frame body 31 encloses a display device, such as a liquid crystal panel. On an inner surface 31a of the frame body 31, a display screen 32 of the display device is provided. The frame body 31 is of a cubic shape complementary with the receptacle cavity 13. A projection 33 is formed to project from one side edge 31a of the frame body 31. As shown in FIG. 1, the projection 33 enters into the support recess 23. In this condition, the projection 33 is pivotably supported by a support shaft 34 extending in a horizontal direction perpendicular to the axis O—O.

In the embodiment shown, connecting means for connecting the display unit 30 to the casing 10 so as to be controllable in attitude is constructed by the support shaft 34 and the rotary body 18.

As shown in FIG. 3, on another side edge 31b opposing the side edge 31a of the frame body 31, a projection 31c is integrally formed for hooking the display unit 30 in the retracted condition in the receptacle cavity 13.

On the inner rear wall 13c of the receptacle cavity 13 is a latching means 35 for latching the display unit 30 in the retracted position. As shown in FIG. 1, the latching means 35 has a latch release button 36 projecting from the surface of the face plate 12 of the casing 10, a latching member 37 projecting from the inner rear wall 13c, and a spring member 38 biasing the latching member 37 to project from the inner rear wall 13c. In the condition shown in FIG. 1, the latching member 37 is projected from the inner rear wall 13c by the biasing force of the spring member 38. When the latching release button 36 is depressed, the latching member 37 is retracted within the inner rear wall 13c against the biasing force.

As shown in FIGS. 1 and 3, a projecting portion 39 for positioning is provided at the tip end of the projection 33. In addition, a cut-out 18e is formed in the rotary body 18. The projecting portion 39 for positioning is inserted into the cut-out 18e.

Figure 4A:
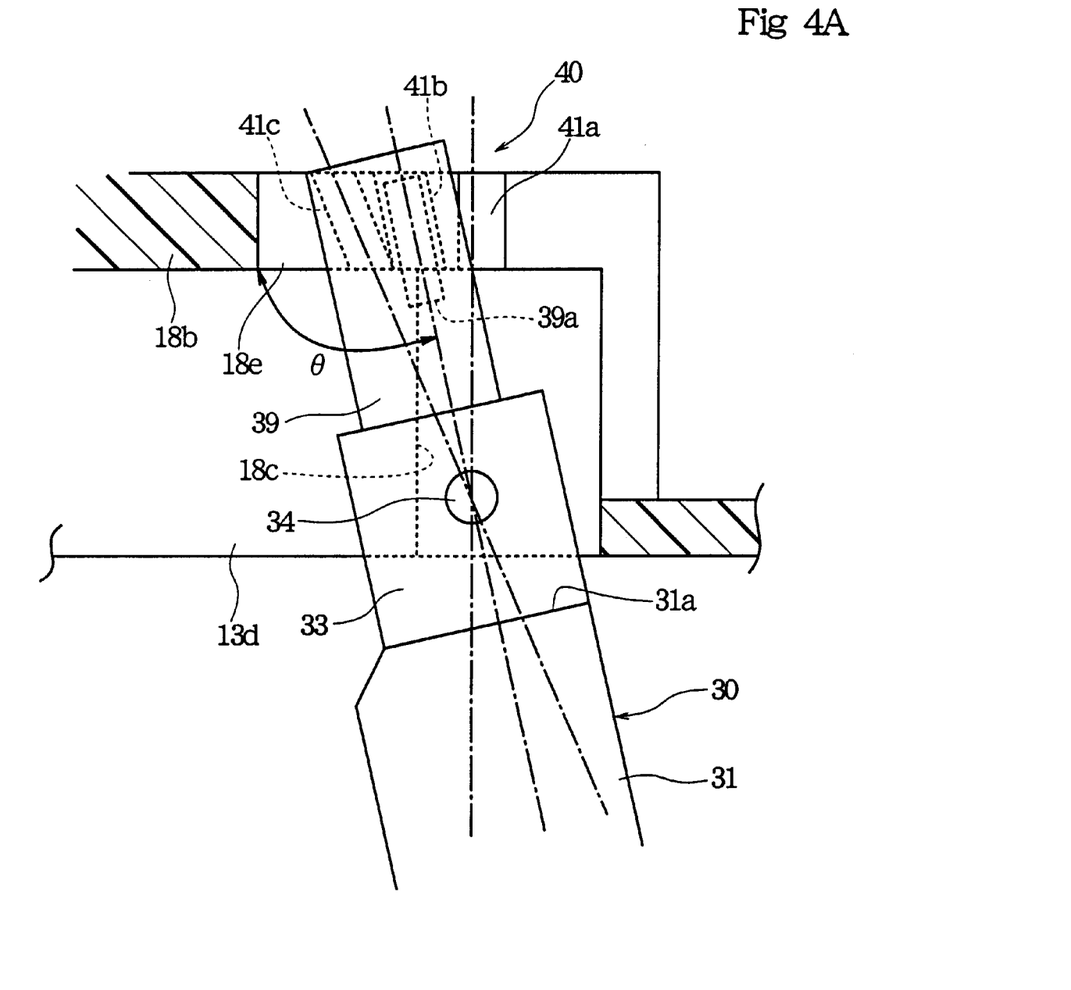
FIG. 4A is an enlarged view of the portion indicated at IV of FIG. 1, showing a structure of a detent mechanism for setting the display unit at any one of a plurality of predetermined pivoted angles when pivoted downwardly.
Figure 4B:
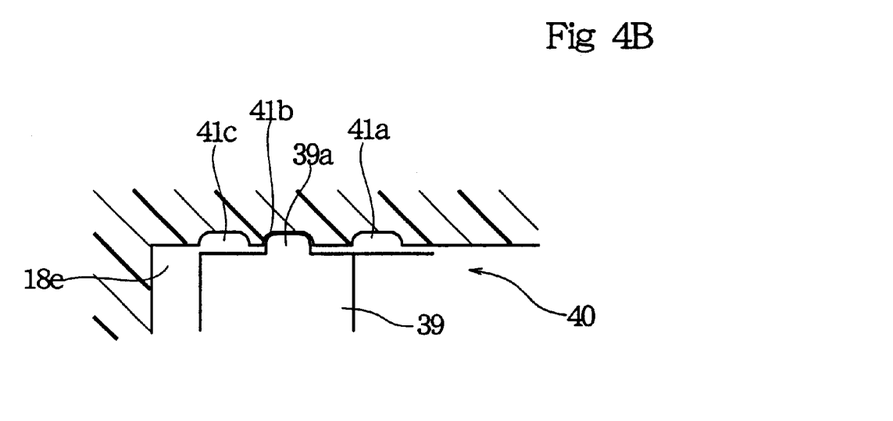
FIG. 4B is a partial plan view of the portion illustrated in FIG. 4A.

As shown in FIGS. 4A and 4B, a detent mechanism 40 is provided between the positioning projecting portion 39 and the cut-out 18e for providing a click action for stabilizing the attitude of the display unit 30. In the detent mechanism 40, a projection 39a is integrally formed on the side portion of the positioning projecting portion 39. Notches 41a, 41b and 41c are formed on the inner wall portion of the cut-out 18e. When the projection 39a and the notch 41a are engaged, the display screen 32 of the display unit 30 stabilizes at a deployed position substantially perpendicular to the surface of the face plate 12 of the casing 10. However, when the projection 39a engages with the notch 41b or the notch 41c, the display screen 32 of the display unit 30 becomes stable at a deployed angle in excess of 90° with respect to the surface of the face plate 12.

On the surface of the face plate 12 of the casing 10, a lighting unit 45 is embedded beyond the inner rear wall 13c. Also, as shown in FIG. 2, a connector 46 for inserting a headphone jack or the like is provided on the surface of the face plate 12 at a position beyond the second semi-circular cavity 14.

The mounting means 2 will be discussed next. As shown in FIG. 1, on the upper surface of the casing 10, mounting projections 19 are integrally formed to project therefrom. In an axial core portion of each mounting projection 19, a mounting hole 19a is formed. As shown in FIG. 3, the mounting holes 19a opening to the inner bottom wall 13a of the receptacle cavity 13 are formed at four positions.

Figure 5:
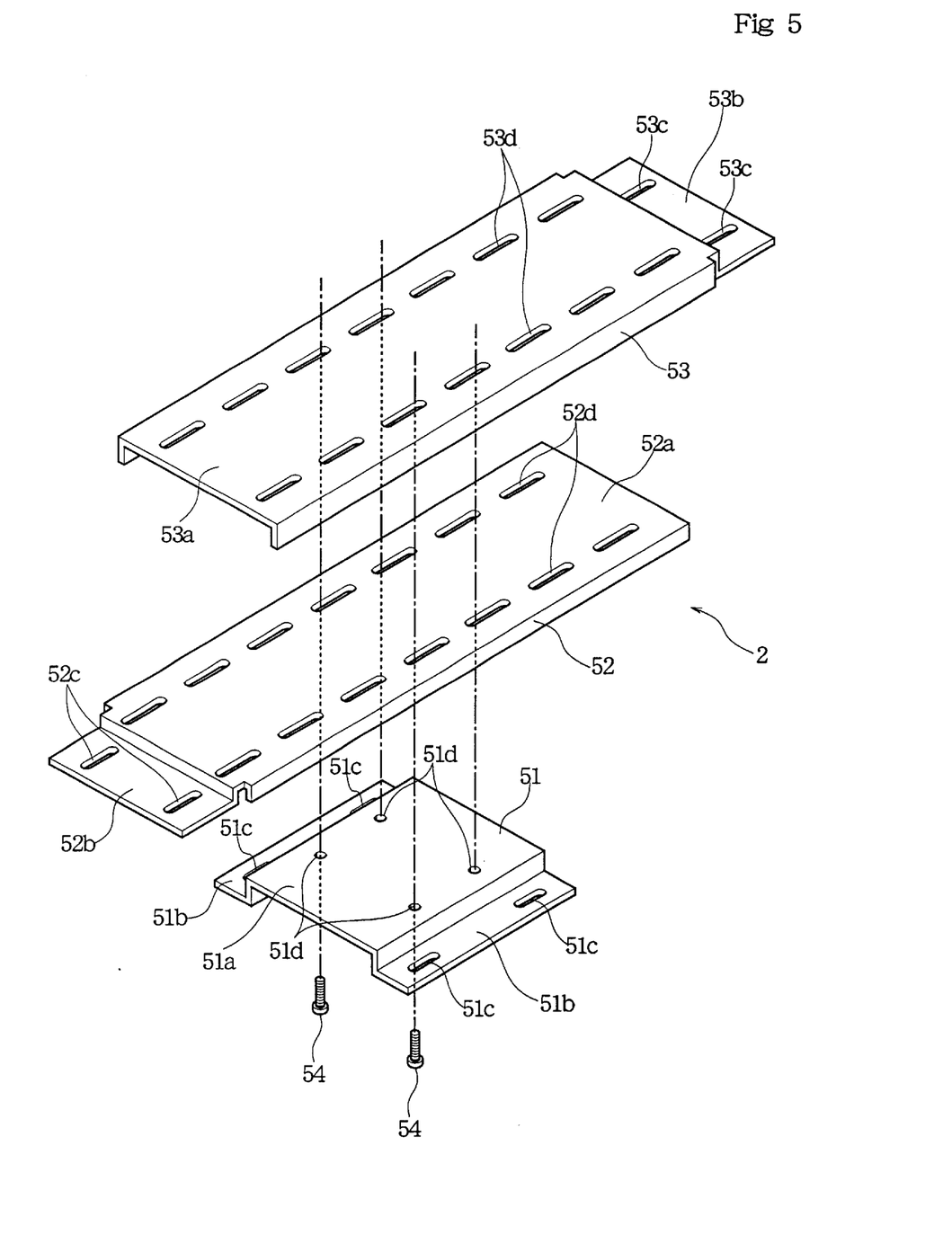
FIG. 5 is an exploded perspective view showing brackets forming a mounting means for mounting the automotive display assembly on the ceiling.

As shown in FIG. 5, the mounting means 2 has three brackets. One of the brackets is a support bracket 51 and is formed by bending a metal plate. The support bracket 51 has a central stepped up portion 51a and left and right flange portions 51b. Each of flange portions 51b is formed with two elongated holes 51c for fastening the casing 10. In the stepped up portion 51a, connecting holes 51d are formed at four locations.

The other two brackets are adjusting brackets 52 and 53. Both adjusting brackets 52 and 53 are formed by bending metal plates. A bent portion 52a of the adjusting bracket 52 is stacked below the bent portion 53a of the adjusting bracket 53 to conform thereto. The adjusting brackets 52 and 53 are provided with fastening strips 52b and 53b. These fastening strips 52b and 53b are formed with elongated fastener holes 52c and 53c, respectively. Then, in the bent portions 52a and 53a, elongated adjusting holes 52d and 53d are formed at a given pitch.

In the mounting means 2, the adjusting brackets 52 and 53 are stacked to adjust the stacking dimension in the longitudinal direction to adjust the distance between the elongated fastener holes 52c and 53c to that of the cross ribs 3 and 3 provided in the roof panel of the vehicular body (FIG. 1). Then, below the bent portion 52a of the lower adjusting bracket 52, the stepped up portion 51a of the support bracket 51 is stacked to conform thereto. Screws 54 are inserted through the connecting holes 51d of the support bracket 51 and also through the elongated adjusting holes 52d of the adjusting bracket 52 and the elongated adjusting hole 53d of the adjusting bracket 53 to be tightened with nuts (not shown) on the adjusting bracket 53. In this condition, the support bracket 51 and adjusting brackets 52 and 53 are assembled.

These brackets 51, 52 and 53 thus assembled are placed on the ceiling of the automotive vehicle and fastened to the cross ribs 3 of the vehicular body with fastening bolts 58 inserted through the elongated fastener holes 52c and 53c.

Between the mounting projections 19 provided on the upper surface of the casing 10 and the flange portions 51b of the support bracket 51, shims 55 for setting a height are interposed. Through each mounting hole 19a, a fastening screw 56 is inserted from the inside of the receptacle cavity 13. The fastening screw 56 is inserted through a center hole of the shim 55 and the elongated fastener hole 51c of the support bracket 51 and fastened with a nut 57 on the flange portion 51b.

Upon mounting the casing 10 to the support bracket 51, the cover 5 is sandwiched between the casing 10 and the lining 4 of the ceiling of the vehicle. Upon fastening the casing 10 to the support bracket 51, the cover 5 is fixed around the casing 10. On the ceiling of the automotive vehicle, the casing 10 is installed above a front seat or at an area midway between the front and rear seats. The casing 10 is located with its front portion having the rotary body 18 being oriented to the front side of the vehicular body (as indicated by the arrow F).

In FIG. 2, the display unit 30 is illustrated in the retracted position, in which the display unit 30 is received within the receptacle cavity 13 of the casing 10. At this time, the wall 18c of the rotary body 18 is placed substantially flush with the inner front wall 13b. The rotary body 18 is lightly locked by the locking means 20, and the axial center of the support shaft 34 connecting the display unit 30 and the rotary body 18 extends substantially parallel to the wall 18c and the inner front wall 13b. In this condition, the display unit 30 is pivoted into the receptacle cavity 13 with the display screen 32 being oriented upwardly.

Further, the projection 31c provided on the side edge 31b of the display unit 30 engages with the latching member 37 of the latching means 35 to latch the display unit 30 in the retracted condition within the receptacle cavity 13.

When the display unit 30 is in the retracted position as shown in FIG. 2, the outer surface 31d of the frame body 31 of the display unit 30, the outer surface 33a of the projection 33 projecting from the side edge 31a of the frame body 31, the surface of the first half-disc portion 18a of the rotary body 18, and the surface of the face panel 12 of the casing 10 are substantially flush. The flush surface thus formed is a curved, convex surface protruding downwardly as it progresses toward the center portion of the casing 10. In the flush surface, neither the interface portion between the casing 10 and the rotary body 18 nor the interface portion between the display unit 30 and the casing 10 or the rotary body 18 may form a large gap or large unevenness, to provide a good appearance.

In the condition shown in FIG. 2, when the latch release button 36 is depressed, the latching member 37 shown in FIG. 1 is retracted into the inner rear wall 13c of the receptacle cavity 13 to release the latching engagement between the latching member 37 and the projection 31c. Therefore, the display unit 30 begins to pivot downwardly by its own weight about the support shaft 34. At this time, resistance against pivotal motion is applied in the connecting portion between the support shaft 34 and the rotary body 18, so that the display unit 30 can moderately pivot downwardly to stop at a predetermined position.

The display unit 30 thus pivoted to the predetermined position is then forcibly pivoted downwardly by hand. The display unit 30 becomes stable when the projection 39a engages one of the notches 41a, 41b and 41c in the detent mechanism 40, as shown in FIGS. 4A and 4B. When the projection 39a engages with the notch 41a, the display screen 32 is stabilized at a substantially upright position relative to the surface of the face plate 12 of the casing 10. However, when the projection 39a engages with the notch 41b or 41c, the display screen 32 is stabilized at an orientation with an angle θ exceeding 90° relative to the surface of the face plate 12. At any of these deployed positions where the display unit 30 is placed stably, the display screen 32 becomes viewable for a passenger seated on the rear seat.

From these deployed positions, the display unit 30 can be horizontally turned by hand to vary the orientation of the display screen 32 toward the left or right, whereby the rotary body 18 is rotated within the circular cavity. At this time, irrespective of the downward pivoted angle of the display unit 30, the rotary body 18 and the display unit 30 are both rotated about the axis O—O, which is substantially perpendicular to the surface of the face plate 12 of the casing 10.

Accordingly, as shown in FIGS. 1 and 4A, even if the display unit 30 is turned toward the left or the right in the condition where the display screen 32 of the display unit 30 is set at an angle θ exceeding 90° relative to the surface of the face plate 12 of the casing 10, the display unit 30 always rotates about the axis O—O. Therefore, as shown in FIG. 1, a gap δ between the side edge 31a of the frame body 31 of the display unit 30 and the surface of the face plate 12 of the casing 10 can be maintained constant irrespective of the rotated position of the display unit 30 in the horizontal plane.

Therefore, even if the display unit 30 is turned in the horizontal plane toward the left or right in the condition where the display screen 32 of the display unit 30 is set at an angle θ exceeding 90° relative to the surface of the face plate 12 of the casing 10, interference will never be caused between the side edge 31 a and the surface of the face plate 12.

It should be noted that while the described embodiment is designed for rotating the rotary body 18 relative to the casing 10 and for pivoting the display unit 30 downwardly both by manual operation, the present invention is equally applicable in the case where the rotational and/or pivoting operation is performed by a motor actuated mechanism.

It should be also noted that the display screen 32 may be provided on the outer surface 31d of the frame body 31 of the display unit 30. Moreover, any suitable means can be employed for locking the display unit 30 to the casing 10 in the retracted position, in place of the latching means 35. Also, the display assembly of the present invention is not limited to automotive use, but may be installed on a ceiling of a house or the like.

As a result of the various structures described in detail above, the advantages of the invention may include one or more of the following.

Even if the display unit is rotated in the horizontal plane toward the left or the right in the condition where the display screen of the display unit is pivoted downwardly and set at an angle exceeding 90° relative to the surface of the face plate of the casing, interference will never be caused between the side edge of the display unit and the surface of the face plate, so that the display screen of the display unit can be set at an optimal position for viewing from the rear seat. In addition, since the rotary body is rotatably supported on the casing and the display unit is pivotably supported on the rotary body, the structure of the connecting portion supporting the display unit on the casing to be controllable in attitude can be made more durable so as to rarely cause play in the pivoting of the display portion.

Although the present invention has been illustrated and described with respect to exemplary embodiments thereof, it should be understood by those skilled in the art that the foregoing and various other changes, omission and additions may be made therein and thereto, without departing from the spirit and scope of the present invention. Therefore, the present invention should be understood not to be limited to the specific embodiments set out above but to include all possible embodiments which can be embodied within a scope encompassed by and equivalent to the features set out in the appended claims.

What is claimed is:

1. A display assembly to be mounted on a ceiling portion of a space comprising:

a casing having a downwardly directed face and a receptacle cavity opening into said face;

a display unit having a display screen to be received within said receptacle cavity; and connecting means for connecting said display unit to said casing to be controllable in attitude, said connecting means having a rotary body rotatable with respect to said casing about a first axis substantially perpendicular to said face of said casing, said display unit being supported on said rotary body for pivoting about a second axis extending perpendicular to said first axis, whereby when said rotary body is placed at a predetermined rotational position, said display unit is able to be pivoted relative to said rotary body to be received within said receptacle cavity;

wherein said receptacle cavity includes at least one inner side wall, and when said rotary body is placed at said predetermined rotational position, said rotary body has a wall surface that is substantially flush with one of the inner side walls of said receptacle cavity and said second axis becomes parallel to said one inner side wall of said receptacle cavity, to thereby enable said display unit to be received in said receptacle cavity; and said easing is formed with a circular cavity formed to extend from said face of said casing to an inner bottom surface of said receptacle cavity, said rotary body is of a generally disc shape and has a first half-disc portion having a lower surface lying substantially flush with said face of said casing and a second half-disc portion having a lower surface lying substantially flush with said inner bottom surface of said receptacle cavity, said rotary body is rotatably supported within said circular cavity, and said first and second half-disc portions are arranged at opposite sides across a boundary wall lying therebetween and providing said wall surface of said rotary body.

2. The display assembly as set forth in claim 1, which is provided with a lock mechanism between said casing and said rotary body for stabilizing said rotary body at said predetermined rotational position, when said wall surface of said rotary body lies substantially flush with said one inner side wall of said receptacle cavity.

3. The display assembly as set forth in claim 1, wherein said display unit is supported on said rotary body so that said display screen of said display unit is permitted to pivot in excess of 90° relative to said face of said casing.

4. The display assembly as set forth in claim 1, wherein said rotary body is formed with a recess formed by recessing said boundary wall toward said first half-disc portion, said display unit has a projection extending from one side thereof into said recess, said projection being pivotably supported on said rotary body within said recess by a horizontally extending shaft providing said second axis, and when said display unit is received within said receptacle cavity, said face of said casing, an outer surface of said display unit, said lower surface of said first half-disc portion of said rotary body and an outer surface of said projection provide a substantially flush surface.

5. The display assembly as set forth in claim 4, wherein said substantially flush surface is a curved convex surface protruding downwardly.

6. The display assembly as set forth in claim 4, wherein a detent mechanism is provided between said projection and said rotary body for selectively stabilizing said display unit at one of a plurality of pivoted angles.

7. The display assembly as set forth in claim 6, wherein said detent mechanism enables said display screen of said display unit to stabilize at pivoted angles including an angle at substantially 90° and an angle in excess of 90° with respect to said face of said casing.

8. The display assembly as set forth in claim 1, which is provided with a latch for latching said display unit to said casing when said display unit is received within said receptacle cavity.

9. The display assembly as set forth in claim 1, wherein said casing is formed with mounting holes opening into said inner bottom surface of said receptacle cavity and said casing is fixed by screws, which are inserted from said receptacle cavity through said mounting holes, to a bracket to be fixed to a ceiling portion in a passenger compartment of a vehicle.

10. The display assembly as set forth in claim 9, wherein at least one shim for setting a distance between said casing and bracket is provided between said casing and said bracket.

11. The display assembly as set forth in claim 9, wherein said bracket is to be fixed to a pair of ribs of the body of the vehicle, and said bracket is provided with adjusting means for adjusting a fixing distance adapting to the distance between said ribs.

12. The display assembly as set forth in claim 9, wherein a connecting portion between said display unit and said casing is located on the front side in the longitudinal direction of the vehicle, and said display screen of said display unit, when pivoted downwardly, is viewable from a rear seat of the vehicle.

13. A display assembly to be mounted on a surface comprising:

a casing having a face and a receptacle cavity opening into said face;

a display unit having a display screen to be received within said receptacle cavity; and a connector connecting said display unit to said casing to be controllable in attitude, said connector having a rotary body rotatable about a first axis substantially perpendicular to said face of said casing, said display unit being supported on said rotary body for pivoting about a second axis, whereby when said rotary body is placed at a predetermined rotational position, said display unit is able to be pivoted relative to said rotary body to be received within said receptacle cavity;

wherein said receptacle cavity includes at least one inner side wall, and when said rotary body is placed at said predetermined rotational position, said rotary body has a wall surface that is substantially flush with one of the inner side walls of said receptacle cavity and said second axis becomes parallel to said one inner side wall of said receptacle cavity, to thereby enable said display unit to be received in said receptacle cavity; and said casing is formed with a circular cavity formed to extend from said face of said casing to an inner bottom surface of said receptacle cavity, said rotary body is of a generally disc shape and has a first half-disc portion having a lower surface lying substantially flush with said face of said casing and a second half-disc portion having a lower surface lying substantially flush with said inner bottom surface of said receptacle cavity, said rotary body is rotatably supported within said circular cavity, and said first and second half-disc portions are arranged at opposite sides across a bounds wall lying therebetween and providing said wall surface of said rotary body.

14. The display assembly as set forth in claim 13, which is provided with a lock mechanism between said casing and said rotary body for stabilizing said rotary body at said predetermined rotational position, when said wall surface of said rotary body lies substantially flush with said one inner side wall of said receptacle cavity.

15. The display assembly as set forth in claim 13, wherein said display unit is supported on said rotary body so that said display screen of said display unit is permitted to pivot in excess of 90° relative to said face of said casing.

16. The display assembly as set forth in claim 13, wherein said connector includes a detent mechanism for selectively stabilizing said display unit at one of a plurality of pivoted angles.

17. The display assembly as set forth in claim 16, wherein said detent mechanism enables said display screen of said display unit to stabilize at pivoted angles including an angle at substantially 90° and an angle in excess of 90° with respect to said face of said casing.

18. The display assembly as set forth in claim 13, which is provided with a latch for latching said display unit to said casing when said display unit is received within said receptacle cavity.

* * * * *